United States Patent
Kayi et al.

(10) Patent No.: US 10,891,274 B2
(45) Date of Patent: Jan. 12, 2021

(54) DATA SHUFFLING WITH HIERARCHICAL TUPLE SPACES

(71) Applicant: International Business Machines Corporation, Armonk, NY (US)

(72) Inventors: Abdullah Kayi, Elmsford, NY (US); Carlos Henrique Andrade Costa, White Plains, NY (US); Yoonho Park, Chappaqua, NY (US); Charles Johns, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 15/851,511

(22) Filed: Dec. 21, 2017

(65) Prior Publication Data

US 2019/0197138 A1 Jun. 27, 2019

(51) Int. Cl.
*G06F 16/21* (2019.01)
*G06F 16/22* (2019.01)
*G06F 16/23* (2019.01)

(52) U.S. Cl.
CPC ........ *G06F 16/212* (2019.01); *G06F 16/2282* (2019.01); *G06F 16/2379* (2019.01)

(58) Field of Classification Search
CPC .................................................. G06F 16/212
See application file for complete search history.

(56) References Cited

U.S. PATENT DOCUMENTS

| | | | |
|---|---|---|---|
| 9,424,274 B2 | 8/2016 | Cramer et al. | |
| 10,152,323 B2 | 12/2018 | Roussel et al. | |
| 2004/0162827 A1 | 8/2004 | Nakano | |
| 2005/0246682 A1 | 11/2005 | Hines | |
| 2006/0271528 A1* | 11/2006 | Gorelik | G06F 16/24544 |
| 2011/0029759 A1 | 2/2011 | Macy et al. | |
| 2013/0345999 A1* | 12/2013 | Hafen | G01R 21/133 |
| | | | 702/60 |
| 2014/0019491 A1 | 1/2014 | Hamel | |
| 2014/0059552 A1* | 2/2014 | Cunningham | G09G 5/00 |
| | | | 718/102 |

(Continued)

FOREIGN PATENT DOCUMENTS

WO WO-2017086987 A1 * 5/2017 ....... G06F 16/90335

OTHER PUBLICATIONS

List of IBM Patents or Patent Applications Treated As Related.

*Primary Examiner* — Dawaune A Conyers
(74) *Attorney, Agent, or Firm* — Scully, Scott, Murphy & Presser, P.C.; Daniel P. Morris

(57) ABSTRACT

Methods and systems for shuffling data to generate a dataset are described. A first map module may generate first pair data, and a second map module may generate second pair data, from source data. The first map module may insert the first pair data into a first local tuple space accessible to the first map module. The second map module may insert the second pair data into a second local tuple space accessible to the second map module. A shuffle module may request pair data that includes a particular key. The first and second pair data may be inserted into a global tuple space accessible by the first and second map modules. The shuffle module may identify the requested pair data in the global tuple space, and may fetch the identified pair data from a memory. The shuffle module may shuffle the fetched pair data to generate the dataset.

20 Claims, 5 Drawing Sheets

(56) References Cited

U.S. PATENT DOCUMENTS

| | | | |
|---|---|---|---|
| 2015/0150017 A1* | 5/2015 | Hu | G06F 12/00 |
| | | | 718/103 |
| 2015/0331724 A1* | 11/2015 | Sahu | G06F 9/5083 |
| | | | 718/104 |
| 2016/0034205 A1* | 2/2016 | Mehra | G06F 3/061 |
| | | | 711/153 |
| 2019/0196783 A1* | 6/2019 | Andrade Costa | G06F 16/2228 |

* cited by examiner

DATA SHUFFLING WITH HIERARCHICAL TUPLE SPACES

This invention was made with government support under Contract No. DE-AC02-05CH11231, Subcontract No. 6940385 awarded by the Department of Energy. The government has certain rights to this invention.

FIELD

The present application relates generally to computers, and computer applications, and more particularly to computer-implemented methods and systems data management systems.

BACKGROUND

In data management systems, data shuffling is often used as a building block for various operations on data (e.g. sort, reduce, group), and is widely used in big data frameworks (e.g., Spark, MapReduce, Hadoop etc.). In some examples, data shuffling may be associated with the repartitioning and aggregation of data in an all-to-all operations.

SUMMARY

In some examples, methods for shuffling source data to generate a dataset are generally described. The methods may include generating, by a first map module of a processor, first pair data from the source data. The methods may further include generating, by a second map module of the processor, second pair data from the source data. Each pair data among the first pair data and the second pair data may include a key and a value associated with the key. The methods may further include inserting, by the first map module of the processor, the first pair data into a first local tuple space accessible by the first map module. The methods may further include inserting, by the second map module of the processor, the second pair data into a second local tuple space accessible by the second map module. The methods may further include activating, by the processor, a shuffle module of the processor to execute a shuffle operation on pair data that includes a particular key. The methods may further include inserting, by the processor, and upon the activation of the shuffle module, the first pair data into a global tuple space accessible by the first map module and the second map module. The methods may further include inserting, by the processor, and upon the activation of the shuffle module, the second pair data into the global tuple space. The methods may further include identifying, by the shuffle module of the processor, pair data including the particular key in the global tuple space. The methods may further include fetching, by the shuffle module of the processor, the identified pair data from a memory. The methods may further include executing, by the shuffle module of the processor, the shuffle operation on the fetched pair data to generate the dataset. The dataset may include the particular key and one or more values associated with the particular key.

In some examples, systems effective to shuffle source data to generate a dataset are generally described. An example system may include a memory configured to store the source data. The system may further include a processor configured to be in communication with the memory. The system may further include at least a first map module and a second map module configured to be in communication with the memory and the processor. The system may further include at least one shuffle module configured to be in communication with the memory and the processor. The first map module may be configured to generate first pair data from the source data. The first map module may be further configured to insert the first pair data into a first local tuple space accessible by the first map module. The second map module may be configured to generate second pair data from the source data. The second map module may be further configured to insert the second pair data into a second local tuple space accessible by the second map module. The processor may be configured to activate the shuffle module to execute a shuffle operation on pair data that includes a particular key. The processor may be further configured to insert, upon the activation of the shuffle module, the first pair data into a global tuple space accessible by the first map module and the second map module. The processor may be further configured to insert upon the activation of the shuffle module, the second pair data into the global tuple space. The shuffle module may be further configured to identify the pair data that includes the particular key in the global tuple space. The shuffle module may be further configured to fetch the identified pair data from the memory. The shuffle module may be further configured to execute the shuffle operation on the fetched pair data to generate the dataset. The dataset may include the particular key and one or more values associated with the particular key.

In some examples, computer program products for shuffling source data to generate a dataset are generally described. The computer program products may include a computer readable storage medium having program instructions embodied therewith. The program instructions may be executable by a device to cause the device to generate first pair data from the source data. The program instructions may be further executable by a device to cause the device to generate second pair data from the source data, wherein each pair data among the first pair data and the second pair data includes a key and a value associated with the key. The program instructions may be further executable by a device to cause the device to insert the first pair data into a first local tuple space accessible by a first map module of the device. The program instructions may be further executable by a device to cause the device to insert the second pair data into a second local tuple space accessible by a second map module of the device. The program instructions may be further executable by a device to cause the device to activate a shuffle phase indicated by the program instructions to execute a shuffle operation on pair data that includes a particular key. The program instructions may be further executable by a device to cause the device to insert, upon the activation of the shuffle phase, the first pair data into a global tuple space accessible by the first map module and the second map module. The program instructions may be further executable by a device to cause the device to insert, upon the activation of the shuffle phase, the second pair data into the global tuple space. The program instructions may be further executable by a device to cause the device to identify pair data including the particular key in the global tuple space. The program instructions may be further executable by a device to cause the device to fetch the identified pair data from a memory. The program instructions may be further executable by a device to cause the device to execute the shuffle operation on the fetched pair data to generate the dataset. The dataset may include the particular key and one or more values associated with the particular key.

DETAILED DESCRIPTION

Briefly stated, methods and systems for aggregating data to generate a dataset are described. A first map module may generate first pair data, and a second map module may generate second pair data, from source data. The first map module may insert the first pair data into a first local tuple space accessible by the first map module. The second map module may insert the second pair data into a second local tuple space accessible by the second map module. A processor may activate a shuffle module to request pair data that includes a particular key. The first and second pair data may be inserted into a global tuple space accessible by the first and second map modules. The shuffle module may identify the requested pair data in the global tuple space, and may fetch the identified pair data from a memory. The shuffle module may execute a shuffle operation on the fetched pair data to generate the dataset.

Figure 1:
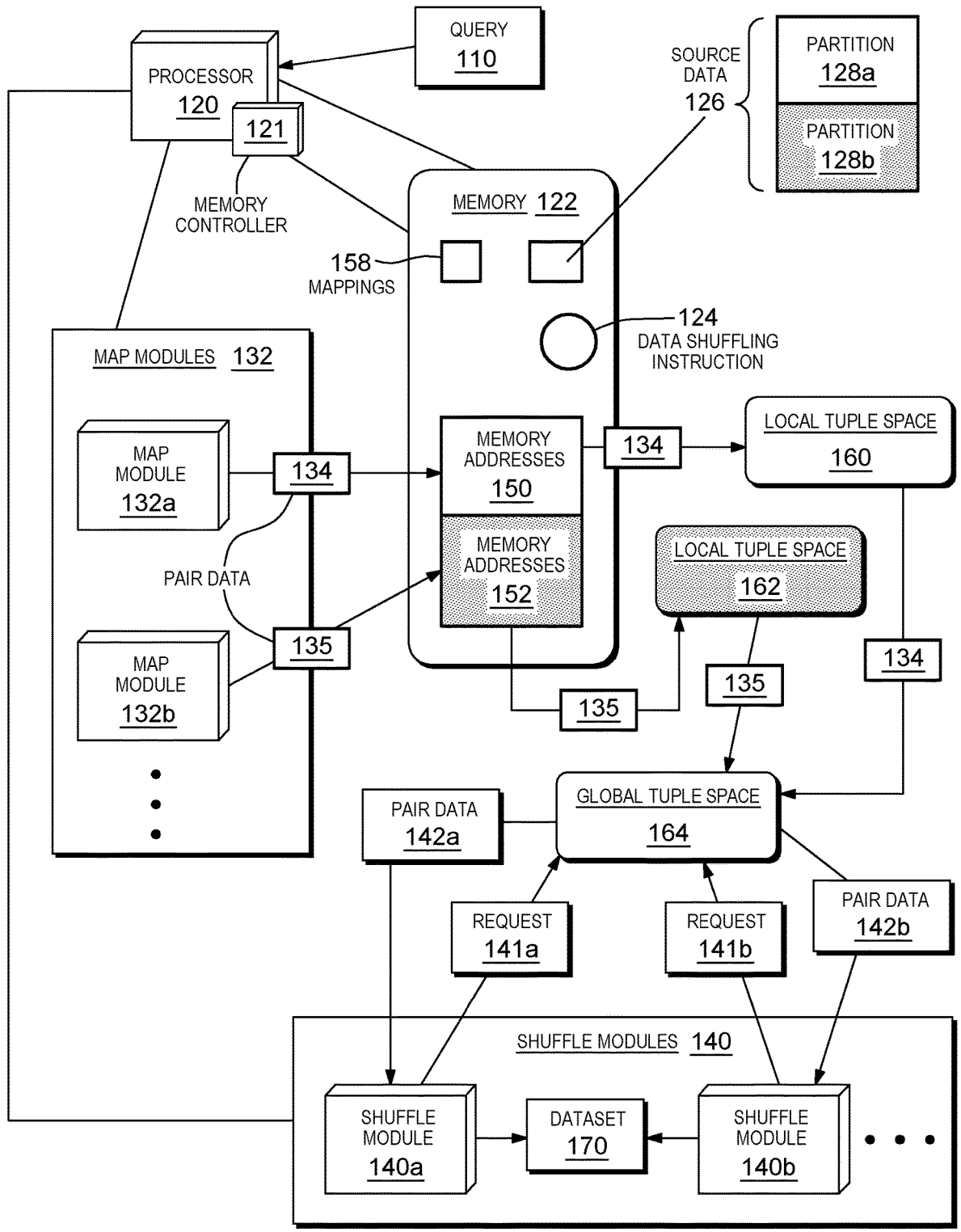
FIG. 1 illustrates an example computer system that can be utilized to implement data shuffling with hierarchical tuple spaces.

FIG. 1 illustrates an example computer system 100 that can be utilized to implement data shuffling with hierarchical tuple spaces, arranged in accordance with at least some embodiments described herein. In some examples, system 100 may be a distributed system including a plurality of processing nodes. System 100 may be a computer system, and may include a processor 120, a memory controller 121, a memory 122, one or more map modules 132 (including map modules 132a, 132b, etc.), and one or more shuffle modules 140 (including shuffle modules 140a, 140b, etc.). Processor 120, memory controller 121, memory 122, map modules 132, and shuffle modules 140 may be configured to be in communication with each other. In some examples, processor 120, memory controller 121, memory 122, map modules 132, and shuffle modules 140 may be housed, or distributed, in a same housing and/or a computer device. In some examples, processor 120, memory controller 121, memory 122, and map modules 132, and shuffle modules 140 may be housed, or distributed, in two or more different housings and/or computer devices. For example, processor 120, memory controller 121 and memory 122 may be distributed in a first device and map modules 132, and shuffle modules 140 may be distributed in a second device different from the first device. In some examples, more than two map modules and more than two shuffle modules, may be included in system 100 depending on a desired implementation. For example, system 100 may be designed to optimize shuffle operations between two or more shuffle modules such that a distributed nature of data shuffling on multiple computing nodes may be captured, and multiple instances of the shuffle modules may exist simultaneously.

In another embodiment, processor 120, memory controller 121, memory 122, and map modules 133, and shuffle modules 140 may each be hardware components or hardware modules of system 100. In some examples, map modules 132, and shuffle modules 140 may each be a hardware component, or hardware modules, of processor 120. In some examples, processor 120 may be a central processing unit of a computer device. In some examples, processor 120 may control operations of map modules 132, and shuffle modules 140. In some examples, each map modules 132, and shuffle modules 140 may each include electronic components, such as integrated circuits. In some examples, each map module 132 and each shuffle module 140 may be software modules that may be implemented with processor 120, or may be software modules that may be implemented with processor 120 to execute respective threads (e.g., map threads, reduce threads, shuffle threads, etc.). In some examples, processor 120 may be configured to control operations of memory controller 121. In some examples, processor 120 may be configured to run an operating system that includes instructions to manage map modules 132, and shuffle modules 140 and memory 122. In some examples, memory controller 121 may be integrated as a chip on processor 120. Memory controller 121 may be configured to manage a flow of data to and from memory 122.

Memory 122 may be configured to store a data shuffling instruction 124. Data shuffling instruction 124 may include one or more set of instructions to facilitate implementation of system 100. In some examples, data shuffling instruction 124 may include instructions executable by an operating system running on processor 120 to manage virtual memory operations and mappings between virtual memory and memory 122. In some examples, data shuffling instructions 124 may be implemented using other methods, such as being implemented in runtime feature, and may be accessed via application programming interface (API) calls. In some examples, memory 122 may be a main memory of a device configured to implement system 100. In some examples, memory 122 may include persistent storage components, or may include dynamic random access memory (DRAM) components.

In an example, system 100 may receive a query 110 indicating an inquiry to process data stored in memory 122 to generate a dataset 170. Generation of dataset 170 may include reorganizing, sorting, grouping, filtering, joining, word counting, etc. based on an index or key of each piece of data among source data 126. For example, query 110 may inquire a number of occurrences of each unique word among source data 126 stored in memory 122. System 100 may be implemented to generate a dataset 170, where dataset 170 may be a piece of data including a response to query 110. In an example associated with word counting, dataset 170 may include data indicating a number of occurrence for each unique word among source data 126. In an example associated with grouping, dataset 170 may include one or more groups of data, where each group may correspond to a respective key.

In another example, query 110 may indicate an inquiry to generate dataset 170 including information of a plurality, and/or a significantly large amount, of different users (e.g., one million, two million, etc.) of a set of social network platforms. Each key may be an identification of a user, such as a username, a name, an ID number, etc. A particular user may have provided a name on a first and second social network platforms, but may have provided an age on the first social network platform and a location on a second social network platform. System 100 may be implemented to combine the information of the particular user such that the generated dataset 170 may include key-value data indicating the name of the particular user, and also the age and location of the particular user, as one piece of data.

Processor 120 may partition source data 126 into one or more partitions, such as partitions 128a, 128b. In an example, source data 126 may be a database including a significantly large amount of data, and each partition may correspond to a portion of the database such as a number of rows. Processor 120 may activate a map phase of the implementation of system 100, such as by activating one or more map modules 132. Processor 120 may assign a map module to generate pair data, or a set of key-value pairs, for each partition. For example, processor 120 may assign map module 132a to generate pair data 134 from partition 128a, and may assign map module 132b to generate pair data 135 from partition 128b. As will be described in more detail below, pair data 134, 135 may each include one or more key-value pairs, and each key-value pair may include a key and a value associated with the key. For example, if query 110 is an inquiry regarding a number of occurrences of words, a key may be a word and a value may be a number of occurrence of the word, or may be a value to indicate a singular presence of the word (e.g., "1" being present). Each map module may store respective generated pair data in memory 122 at a respective set of memory addresses. For example, map module 132a may store the generated pair data 134 in memory 122 at memory addresses 150, and map module 132b may store the generated pair data 135 in memory 122 at memory addresses 152. Memory 122 may include one or more different sets of memory addresses assigned, or allocated to, different map modules. For example, memory addresses 150 may be assigned to map module 132a and memory addresses 152 may be assigned to map module 132b. In another example, processor 120 may generate pair data 134, 135 and may send pair data 134, 135 to respective map modules 132a, 132b for subsequent processing.

Processor 120 may, for example, run an operating system to create virtual memory spaces, such as a local tuple space 160, a local tuple space 162, and a global tuple space 164. Local tuple space 160 may be assigned to map module 132a and local tuple space 162 may be assigned to map module 132b. In some examples, an example tuple space may be associated with a concept of a computation environment implementing an associative memory model for distributed/parallel programming. Tuple spaces may also be associated with fundamental mechanisms of various programming languages.

In an example, local tuple space 160 may be assigned to map module 132a such that other map modules (e.g., map modules 132b), may not have access to local tuple space 160. In an example, when map module 132b does not have access to local tuple space 160, map module 132b may fail to determine a storage location of pair data 134 generated and/or stored by map module 132a. Similarly, local tuple space 162 may be assigned to map module 132b and may be inaccessible by map module 132a.

Map modules 132 may each insert respective generated pair data into an assigned local tuple space. For example, map module 132a may insert pair data 134 into local tuple space 160 and map module 132b may insert pair data 134 into location tuple space 162. Insertion of a piece of pair data into a local tuple space may include populating an entry of the local tuple space with an indication, or identification, of the piece of pair data (further described below).

Processor 120 may map memory addresses of memory 122 to one or more locations, or entries of local tuple spaces 160, 162 based on the insertion of pair data 134, 135 in local tuple spaces 160, 162. For example, processor 120 may map a memory address storing pair data 134 to a location among local tuple space 160, and may generate one or more page tables, such as mappings 158, to indicate the mappings between memory addresses 150, 152 of memory 122 and local tuple spaces 160, 162. Processor 120 may store mappings 158 in memory 122.

In an example, data shuffling instructions 124 may include instructions indicating a need to activate a shuffle phase of an implementation of system 100 subsequent to a map phase of the implementation (e.g., map phase may include, for example, generation of pair data and insertion of pair data into local tuple spaces). A shuffle phase may correspond to, for example, a reduce phase in a mapreduce framework, a key-based sorting phase, a key-based grouping phase, etc. Thus, upon a completion of generating pair data 134, 135, and mapping memory addresses of memory 122 to local tuple spaces, processor 120 may activate one or more shuffle modules 140 to execute data shuffling operations (e.g., aggregate, sort, filter, group, etc.) in order to generate dataset 170. For example, processor 120 may activate shuffle module 140a to aggregate pair data including a first key, and may activate shuffle module 140b to aggregate pair data that includes a second key (further described below). In some examples, processor 120 may activate shuffle modules 140 to sort, join, group, organize, pair data based on one or more keys. Shuffle modules 140 may be configured to execute key-based shuffle operations associated with data shuffling such as sorting, joining, grouping, etc. pair data based on one or more keys of the pair data.

Upon the activation of shuffle modules 140a, 140b, each shuffle module 140 may request a particular key from the global tuple space, such as by communicating with memory controller 121 and/or processor 120 to identify memory addresses storing pair data that includes particular keys. For example, shuffle module 140a may generate a request 141a for pair data including the first key, and shuffle module 140b may generate a request 141b for pair data including the second key. In response to activation of shuffle modules 140a, 140b, and/or in response to requests 141a, 141b, processor 120 may insert pair data among each local tuple space to global tuple space 164, where global tuple space 164 may be accessible by all map modules including map modules 132a, 132b. Insertion of a piece of pair data into global tuple space 164 may include populating an entry of the global tuple space with an indication, or identification, of the piece of pair data (further described below). In some examples, processor 120 may append metadata to a key of each pair data prior to inserting the pair data into global tuple space 164 (further described below). Processor 120 may map memory addresses of memory 122 that stored pair data 134, 135 to entries, or locations, of global tuple space 164. Processor 120 may update mappings 158 to include mappings between memory 122 and global tuple space 164.

Upon inserting pair data 134, 135 into global tuple space 164, shuffle module 140a may identify pair data 142a in global tuple space 164, where pair tuple 142a may include key-value pairs including the first key requested by shuffle module 140a. Shuffle module 140a, based on mappings 158, may identify memory addresses of memory 122 that stored pair data 142a, where the identified memory addresses may include memory addresses among both memory addresses 150, 152. Shuffle module 140a may fetch pair data 142a from the identified set of memory addresses.

Similarly, shuffle module 140b may identify pair data 142b in global tuple space 164, where pair tuple 142b may include key-value pairs including the second key requested by shuffle module 140b. Shuffle module 140b, based on mappings 158, may identify memory addresses of memory 122 that stored pair data 142b, where the identified memory addresses may include memory addresses among both memory addresses 150, 152. Shuffle module 140b may fetch pair data 142b from the identified set of memory addresses.

Shuffle module 140a may aggregate the fetched pair data 142a that includes the first key to generate a piece of pair data that may be a part of dataset 170. For example, shuffle module 140a may generate a piece of pair data including the first key and one or more aggregated values associated with the first key (further described below). Similarly, shuffle module 140b may aggregate the fetched pair data 142b that includes the second key to generate a piece of pair data that may be a part of dataset 170. Processor 120 may further combine the pair data generated by shuffle module 142a, shuffle module 142b, and/or additional shuffle modules, to complete a generation of dataset 170. As a result, dataset 170 may be include a plurality of key-value pairs, where each key-value pair includes a key, and includes one or more aggregated values associated with the corresponding key (further described below).

Figure 2:
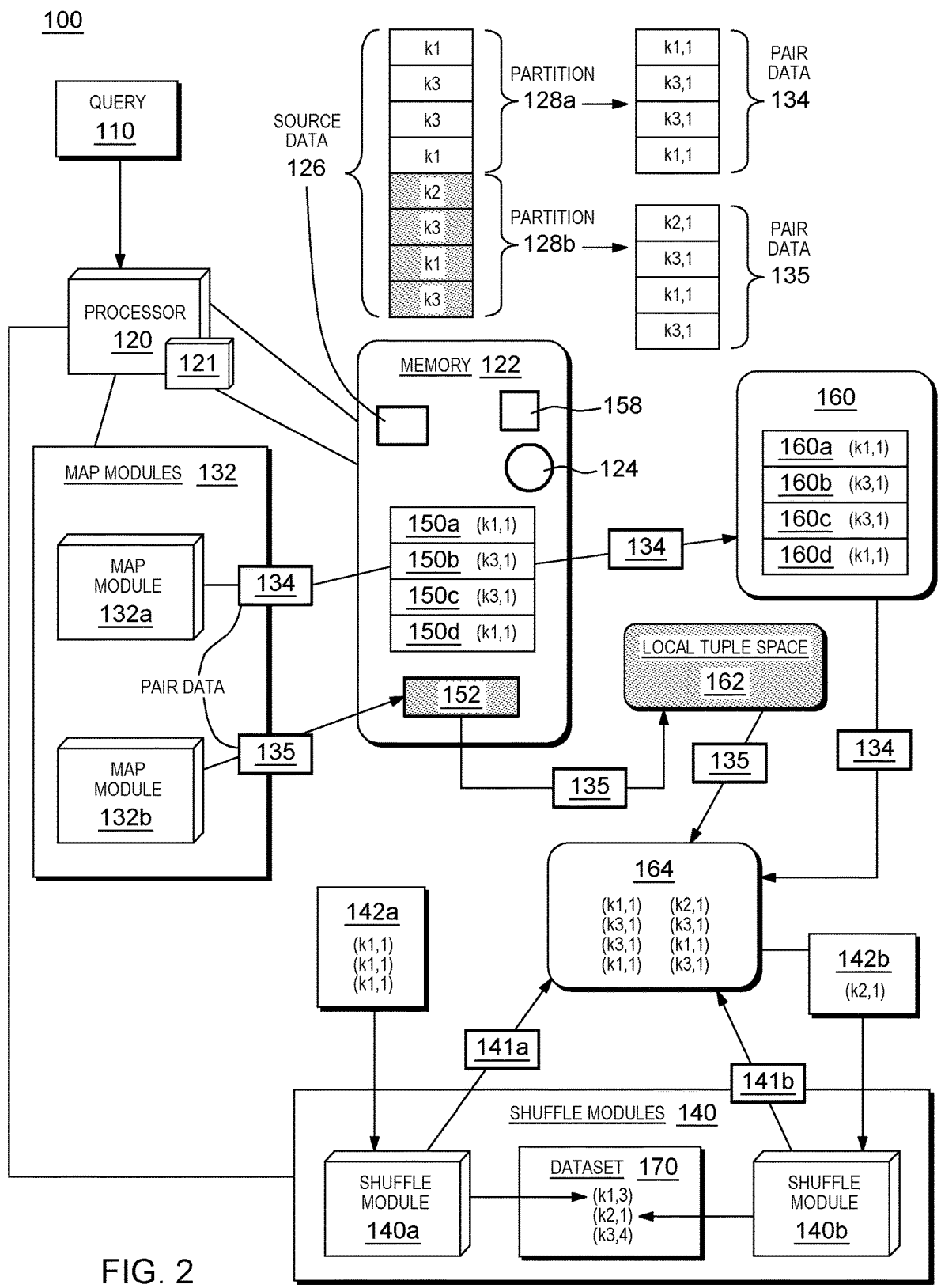
FIG. 2 illustrates the example system of FIG. 1 with additional details relating to data shuffling with hierarchical tuple spaces.

FIG. 2 illustrates the example system of FIG. 1 with additional details relating to data shuffling with hierarchical tuple spaces, arranged in accordance with at least some embodiments described herein. FIG. 2 is substantially similar to computer system 100 of FIG. 1, with additional details. Those components in FIG. 2 that are labeled identically to components of FIG. 1 will not be described again for the purposes of clarity.

In an example shown in FIG. 2, system 100 may receive a query 110 indicating an inquiry to count a number of occurrences of each unique word among source data 126 stored in memory 122. Source data 126 may include one or more occurrences of words "k1", "k2", "k3". Processor 120 may partition source data 126 into partitions 128a, 128b, where partition 128a includes words "k1", "k3", "k3", "k1", and partition 128b includes words "k2", "k3", "k1", "k3". Processor 120 may assign map module 132a to generate pair data 134 from partition 128a, and may assign map module 132b to generate pair data 135 from partition 128b.

In an example, map module 132a may convert each word among partition 128a into a key-value pair, such as by counting an occurrence of each word. As shown in the example, a key-value pair (k1, 1) may represent a singular occurrence of the word "k1". In the example, pair data 134 generated from partition 128a may include key-value pairs (k1, 1), (k3, 1), (k3,1), (k1, 1). Map module 132a may store pair data 134 in memory 122 at a set of memory addresses 150a, 150b, 150c, 150d. Similarly, pair data 135 generated from partition 128b may include key-value pairs (k2, 1), (k3, 1), (k1,1), (k3, 1). Map module 132b may store pair data 135 in memory 122 at a set of memory addresses 152. Map module 132a may insert pair data 134 into local tuple space 160, where local tuple space 160 may be accessible by map module 132a and may be inaccessible by map module 132b. Map module 132a may insert an indication, such as a key-value pair, of pair data 134 into locations of local tuple space 160. For example, map module 132a may insert the key-value pair (k1,1) into location 160a of local tuple space 160, and may insert the key-value pair (k1,1) into location 160d of local tuple space 160. Similarly, map module 132b may insert pair data 135 into local tuple space 162, where local tuple space 162 may be accessible by map module 132b and may be inaccessible by map module 132a.

Upon storing pair data 134, 135 in memory 122, and inserting pair data 134, 135 into local tuple spaces 160, 162, processor 120 may map memory addresses 150a, 150b, 150c, 150d to one or more locations of local tuple space 160.

In the example shown in FIG. 2, memory address 150a may be mapped to location 160a of local tuple space 160 (based on (k1,1) being stored at memory address 150a and inserted in location 160a), and memory address 150d may be mapped to location 160b of local tuple space 160 (based on (k1,1) being stored at memory address 150d and inserted in location 160d). A selection of mapping locations to map memory addresses 150 may be performed by processor 120, or by an operating system being executed by processor 120, or memory controller 121, based on various memory management algorithms. In response to mapping memory addresses 150 to local tuple space 160, processor 120 may update mappings 158 stored in memory 122.

Processor 120 may activate and assign a shuffle module to aggregate pair data based on a same key. For example, if the query received at system 100 relates to word counting, processor 120 may assign a set of shuffle modules to count words, where each shuffle module may be responsible to count one particular word. In the example, processor 120 may assign shuffle module 140a to determine a number of occurrences of word "k1" among source data 126, and may assign shuffle module 140b to determine a number of occurrences of word "k2" among source data 126.

Shuffle module 140a may generate a request 141a for pair data including word "k1", and shuffle module 140b may generate a request 141a for pair data including word "k2". In response to requests 141a, 141b, processor 120 may insert pair data 134, 135 into global tuple space 164. Upon the insertion of pair data 134, 135 into global tuple space 164, global tuple space 164 may include indications of all key-value pairs among pair data 134, 135, as shown in FIG. 2. Processor 120 may map memory addresses 150, 152, which stored pair data 134, 135, to locations of global tuple space 164. Processor 120 may update mappings 158 to include mappings between memory 122 and global tuple space 164.

In some examples, processor 120 may append metadata to a key of each pair data prior to inserting the pair data into global tuple space 164. For example, processor 120 may append an indicator to each key among pair data 134, where the indicator may indicate locality information such as an identification of a processor/node/executor (e.g., map module 132a, or a process configured to run a map tasks), an identification of partition 128a, and a memory address storing the pair data with the appended metadata. In some examples, global keys may be generated by appending metadata to each piece of pair data, such that insertion of the pair data into global tuple space 164 includes insertion of pair data including the global keys.

Upon inserting pair data 134, 135 into global tuple space 164, shuffle module 140a may identify pair data 142a in global tuple space 164, where pair data 142a may include multiple, (e.g., three) instances of (k1,1) that were mapped from local tuple spaces 160, 162. Shuffle module 140a, based on mappings 158, may identify memory addresses of memory 122 that stored pair data 142a. Shuffle module 140a may fetch pair data 142a from the identified set of memory addresses. Similarly, shuffle module 140b may identify pair data 142b in global tuple space 164, where pair data 142b may include one instance of (k2,1) that was mapped from local tuple space 162. Shuffle module 140b, based on mappings 158, may identify memory addresses of memory 122 that stored pair data 142b. Shuffle module 140b may fetch pair data 142b from the identified set of memory addresses. In some examples, the fetching operations by shuffle modules 140a, 140b, may be performed in parallel.

Shuffle module 140a may aggregate fetched pair data 142a that includes "k1" to generate a piece of pair data (k1,3) that may be a part of dataset 170. For example, in a word counting example, shuffle module 140*a* may sum the values among pair data 142*a* to conclude that "k1" occurred three times, and output the key-value pair (k1,3). Shuffle module 140*b* may aggregate fetched pair data 142*b* that includes "k2" to generate a piece of pair data (k2,1) that may be a part of dataset 170. In an example with information consolidation from social network platforms, shuffle modules may aggregate fetched pair data by eliminating duplicated values, merging similar values, identifying values that only appeared once, etc. In some examples, the aggregation operations by shuffle modules 140*a*, 140*b*, may be performed in parallel.

Processor 120 may combine the pair data generated by shuffle module 142*a*, shuffle module 142*b*, and/or additional shuffle modules (e.g., another shuffle module may generate (k3,4)), to complete a generation of dataset 170. As a result, dataset 170 may be include a plurality of key-value pairs, where each key-value pair includes a key, and includes one or more aggregated values associated with the corresponding key. As shown in the example, dataset 170 may include key-value pairs (k1,3), (k2,1), and (k3,4) to indicate that there are three occurrences of word "k1", one occurrence of word "k2", and four occurrences of word "k3", in source data 126. Processor 120 may return the output as a response to a device that sent query 110 to system 100. In some examples, upon a completion of generating dataset 170, processor 120 may remove pair data that have been inserted in local tuple spaces 160, 162, and global tuple space 164. Processor 120 may further clear mappings 158 to remove all mappings among memory 122, local tuple spaces 160, 162, and global tuple space 164.

Figure 3:
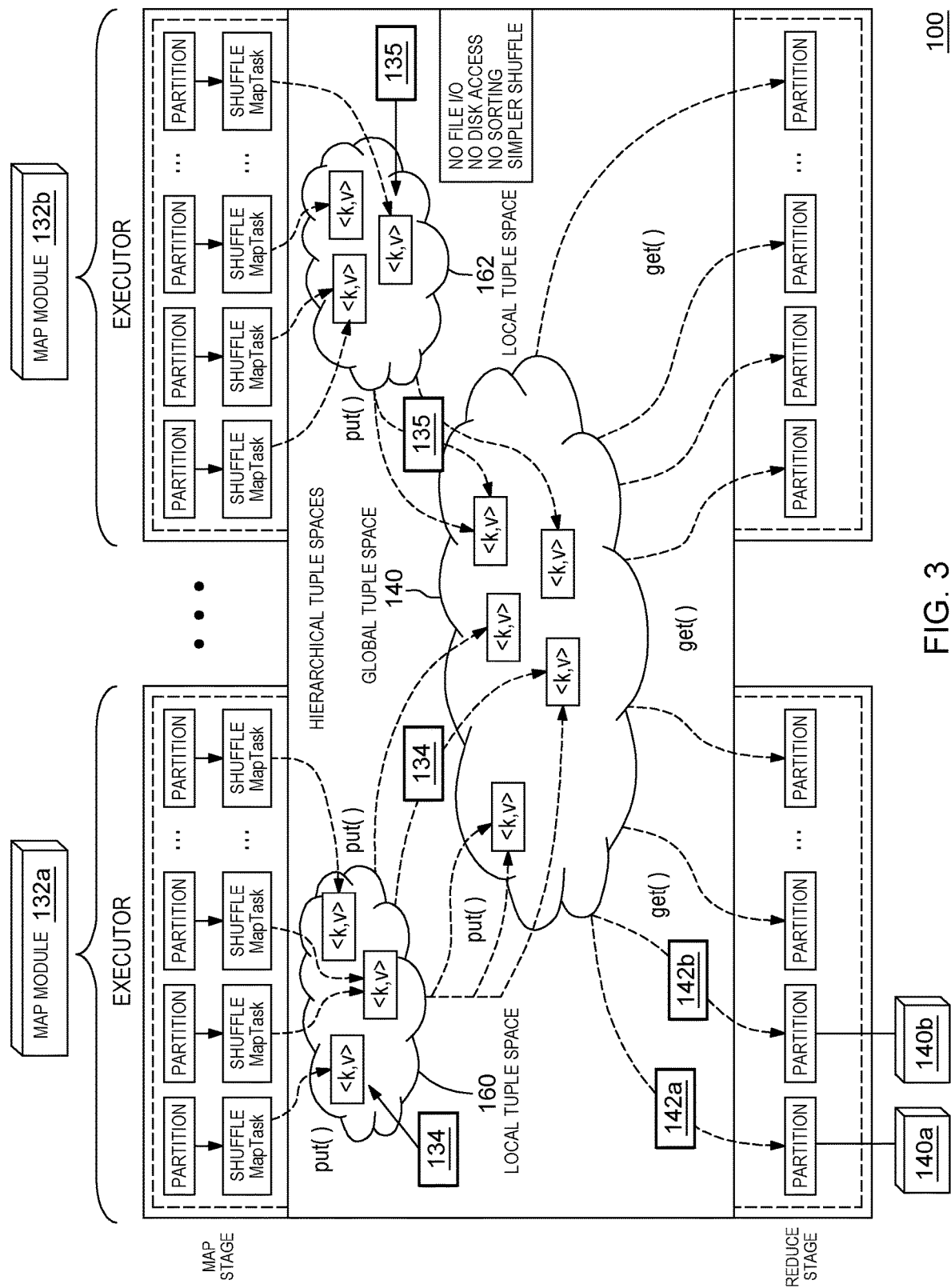
FIG. 3 illustrates the example system of FIG. 1 with additional details relating to data shuffling with hierarchical tuple spaces.

FIG. 3 illustrates the example system of FIG. 1 with additional details relating to data shuffling with hierarchical tuple spaces, arranged in accordance with at least some embodiments described herein. FIG. 3 is substantially similar to computer system 100 of FIG. 1 and FIG. 2, with additional details. Those components in FIG. 3 that are labeled identically to components of FIG. 1 and FIG. 2 will not be described again for the purposes of clarity.

In an example diagram shown in FIG. 3, three processor initiated calls, or instructions, may be executed by system 100—namely "put( )", "get( )", and "read( )", to implement data shuffling with hierarchical tuple spaces. The call "put( )" may cause key-value pairs of data to be transferred into a local tuple space or into global tuple space 164. For example, system 100, or a processor (e.g., processor 120 in FIGS. 1, 2) may execute an API call to instruct map modules 132*a*, 132*b*, to perform the put( ) call to insert pair data 134, 135 into local tuple spaces 160, 162, respectively. System 100 may instruct map modules 132*a*, 132*b*, to perform the put( ) call to insert pair data 134, 135 from local tuple spaces 160, 162 to global tuple space 164.

The call "get( )" may cause system 100 to fetch/remove key-value pairs of data from global tuple space into local tuple space. For example, system 100, or a processor (e.g., processor 120 in FIGS. 1, 2) may execute an operating system to instruct shuffle modules 140*a*, 140*b*, to perform the get( ) call to fetch pair data 142*a*, 142*b* from global tuple space 164, and subsequently, remove pair data 142*a*, 142*b* from global tuple space 164. In some examples, a blocking call may occur during the get( ) call, such that threads being executed among system 100 may be suspended until shuffle modules 140 complete fetching and/or removing pair data from global tuple space 164. In some examples, keys requested by shuffle modules 140 may need to exist in global tuple space 164 in order for get( ) call to be executed successfully. For example, each shuffle module 140 may search for a respective key among global tuple space 164 prior to executing the get( ) call, and may fetch pair data from global tuple space 164 if the keys exists in global tuple space 164.

The call "read( )" may fetch/copy key-value pairs of data from global tuple space into local tuple space. For example, system 100, or a processor (e.g., processor 120 in FIGS. 1, 2) may execute an operating system to instruct shuffle modules 140*a*, 140*b*, to perform the read( ) call to copy pair data 142*a*, 142*b* from global tuple space 164 to another location (e.g., memory address, or local tuple spaces assigned to shuffle modules that may be different from local tuple spaces 160, 162), without removing pair data from global tuple space 164. In some examples, a blocking call may occur during the read( ) call, such that threads being executed among system 100 may be suspended until shuffle modules 140 complete fetching and/or copying pair data from global tuple space 164. In some examples, keys requested by shuffle modules 140 may need to exist in global tuple space 164 in order for read( ) call to be executed successfully. For example, each shuffle module 140 may search for a respective key among global tuple space 164 prior to executing the read( ) call, and may fetch and/or copy pair data from global tuple space 164 if the keys exists in global tuple space 164.

In summary, key-value pairs may be loaded from a persistent storage (e.g., memory 122), or created by a computation (e.g., map module 132) in local memory for each worker thread performed by each map module. Initially, each key-value pair may be added to an assigned local tuple space. At the beginning of a reduce stage, map modules may use a "put( )" call to put requested blocks into the global tuple space. As such, local key value pairs stored in local tuple space may be exposed to the global tuple space, without an actual data transfer. Shuffle modules on the reduce stage may fetch key-value pairs from the global tuple space into respective local tuple space using either a "get( )" or a "read( )" call. The use of "get( )" or "read( )" calls (e.g., move vs. copy, respectively) may be defined by application level hints for persistency (e.g., subsequent use of the data).

A system in accordance with the present disclosure may facilitate an improvement in data shuffle mechanisms by establishing an in-memory hierarchical tuple spaces for key-value pairs as generated from the mappers. The tuple spaces may be hierarchical with local and global spaces, and mappers may transfer local key-value pairs from local to the global tuple space that also resides in a distributed fashion within the system memory. Reducers may fetch key-value pairs from the global tuple space, and the transfer action may be triggered by the fetch request from reducers. As a result, disk I/O overhead may be prevented by utilizing hierarchical in-memory tuple spaces as described above. Further, a system in accordance with the present disclosure may intercept a shuffle write process to avoid file generation for key-value pairs, and may collect all generated key-value pairs inside a local tuple space. Each local tuple space corresponding to a physical computing node may gather key-value pairs from all executors/threads inside the physical computing node. Each key may be appended with a specific executor/partition meta data such that a global key may be generate and data locality may be improved.

In conventional data shuffling schemes, all-to-all communication may be required and thus, may incur major performance cost, may be complex, and may cause problems such as bandwidth and latency issues. Further, typical data shuffling techniques may depend on filesystem and may include I/O limitations. Many current shuffle implementations may store data in blocks on local or distributed disk I/O for data shuffling, which may cause major overhead on an operating system, and both the source and the destination side may require many file and network I/O operations. Some existing data aggregation techniques used for filesystem and communication optimization may add extra computation overheads. For example, techniques that merges files into buckets then reduce the total number of files may use many files, or techniques that utilize sort-based shuffle such that each mapping task may generate one shuffle data file and one index file, may use file I/O operations to store and manage shuffle files.

A system in accordance with the present disclosure may be used to avoid dependency on files for distributed data representation, and eliminate filesystem or disk I/O operations and extra computation to prepare data partitions in the shuffle write stage. A burden on the operating system for managing filesystem and I/O operations may also be mitigated. By eliminating the dependency on the filesystem, a system in accordance with the present disclosure may be used to establish a more efficient full in-memory shuffle mechanism.

Figure 4:
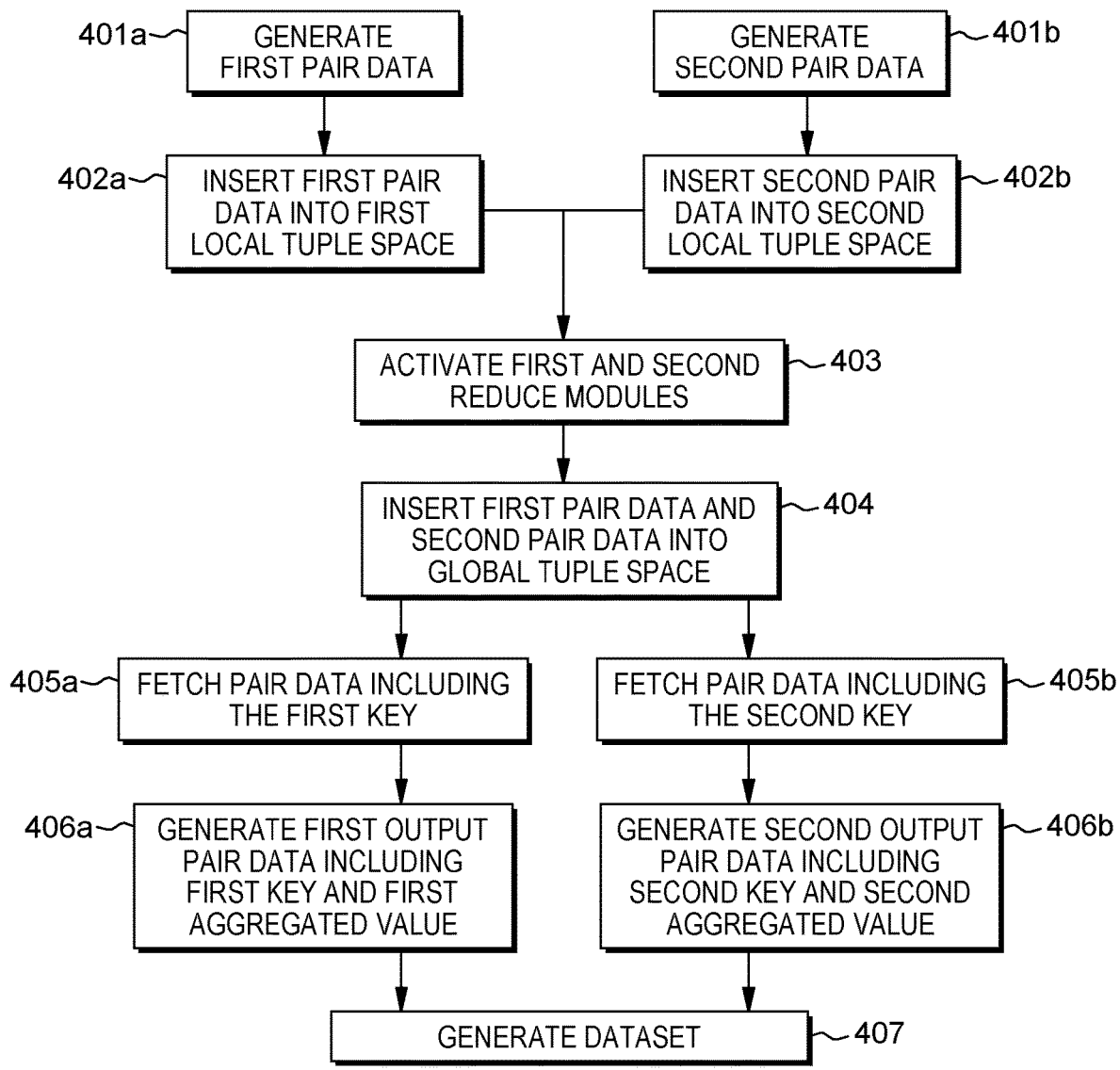
FIG. 4 illustrates a flow diagram for an example process to implement data shuffling with hierarchical tuple spaces.

FIG. 4 illustrates a flow diagram for an example process to implement data shuffling with hierarchical tuple spaces, arranged in accordance with at least some embodiments presented herein. The process in FIG. 4 could be implemented using, for example, computer system 100 discussed above. An example process may include one or more operations, actions, or functions as illustrated by one or more of blocks 401, 402, 403, 404, 405, 406, and/or 407. Although illustrated as discrete blocks, various blocks may be divided into additional blocks, combined into fewer blocks, eliminated, or performed in parallel, depending on the desired implementation.

Processing may begin at blocks 401 (including blocks 401a, 401b), where a first map module of a processor may generate first pair data from source data, and a second map module of the processor may generate second pair data from the source data. In some examples, generation of the first pair data and the second pair data may happen in parallel. Each pair data may include a set of key-value pairs, and each key-value pair may include a key and one or more values associated with the key. For example, a key may be a word, and a value of the key may be a number of occurrences of the word. In another example, a key may be an identification of a person (e.g., name, ID number, etc.) and one or more values associated with the person may be an age, an address, an occupation, education background, hobbies, etc.

Processing may continue from blocks 401 to blocks 402 (including blocks 402a, 402b), where the first map module may insert the first pair data into a first local tuple space, and the second map module may insert the second pair data into a second local tuple space. The first local tuple space may be accessible by the first map module and may be inaccessible by the second map module. The second local tuple space may be accessible by the second map module and may be inaccessible by the first map module.

At blocks 403, the processor may activate a first shuffle module of the processor may activate a second shuffle module of the processor. Upon activation, the first shuffle module may request pair data including a first key. Similarly, upon activation, the second shuffle module may request pair data including a second key.

At blocks 404, in response to the requests from blocks 403, the processor may insert the first pair data and the second pair data into a global tuple space. The global tuple space may be accessible by both the first map module and the second map module.

Processing may continue from blocks 404 to blocks 405, where the first shuffle module may fetch pair data including the first key from the global tuple space, and the second shuffle module may fetch pair data including the second key from the global tuple space. In some examples, the first shuffle module and the second shuffle module may perform a search for each respective requested key prior to performing a fetch operation. If a requested key exists in the global tuple space, then the fetch operations may be performed. In some examples, the processor may block calls from other threads or operations such that the key search and fetch operations may be performed by the shuffle modules.

Processing may continue from blocks 405 to block 406, where the first shuffle module may generate first output pair data and the second shuffle module may generate second output pair data. The first output pair data may include the first key and a first aggregated value, where the first aggregated value may include one or more values associated with the first key. The second output pair data may include the second key and a second aggregated value, there the second aggregated value may include one or more values associated with the second key. For example, if the first key is a name of a first person, the fetched pair data may include one or more key-value pairs such as (name, age), (name, age, location), (name, location, education), etc. collected from one or more social media platforms. The first aggregated value may be a combination of the fetched pair data such that the first output pair data may be (name, age, location, education).

Processing may continue from blocks 406 to blocks 407, where the processor may generate a dataset based on the first output pair data and the second output pair data. The generated dataset may include the first output pair data and the second output pair data.

Figure 5:
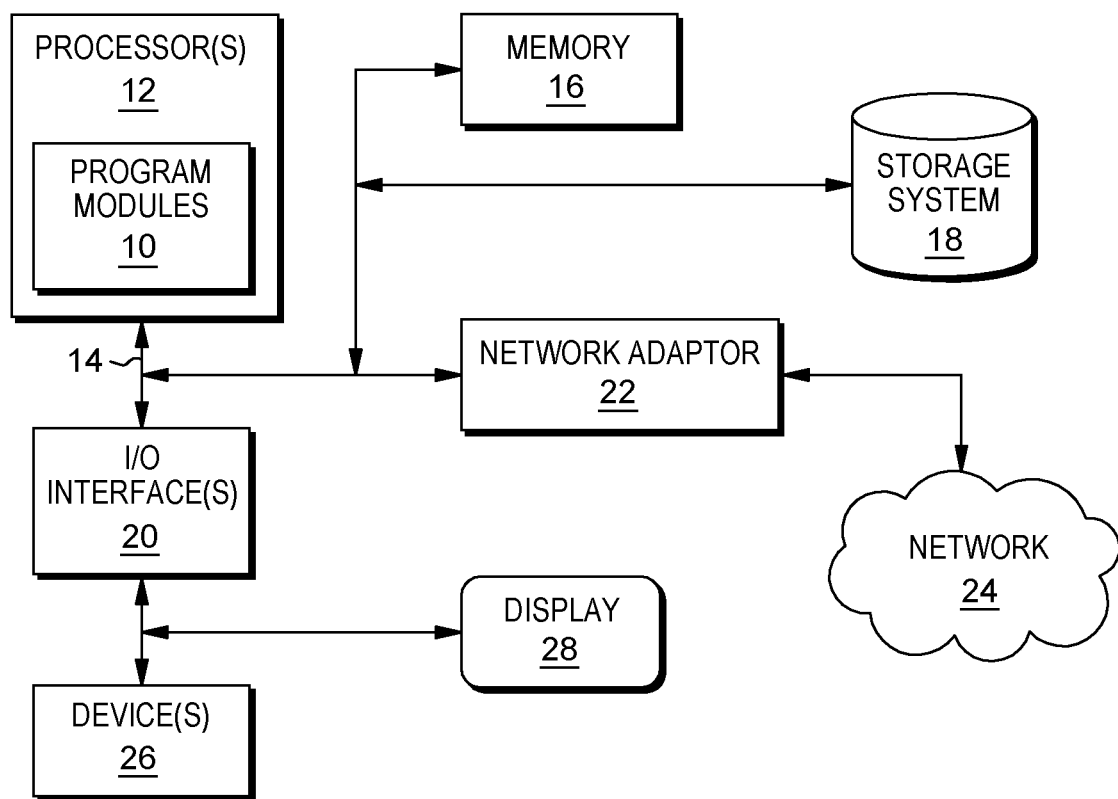
FIG. 5 is an exemplary block diagram of a computer system in which processes involved in the system, method, and computer program product described herein may be implemented.

FIG. 5 illustrates a schematic of an example computer or processing system that may implement any portion of computer system 100, processor 120, memory 122, map modules 132, shuffle modules 140, systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computer system environments or configurations. Examples of well-known computer systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a software module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for shuffling source data to generate a dataset, the method comprising:
    generating, by a first map module of a processor, first pair data from the source data;
    generating, by a second map module of the processor, second pair data from the source data, wherein each pair data among the first pair data and the second pair data includes a key and a value associated with the key;
    inserting, by the first map module of the processor, the first pair data into a first local tuple space accessible by the first map module, wherein the first local tuple space implements associative memory model;
    inserting, by the second map module of the processor, the second pair data into a second local tuple space accessible by the second map module, wherein the second local tuple space implements associative memory model;
    activating, by the processor, a shuffle module of the processor to execute a shuffle operation, on pair data that includes a particular key;
    inserting, by the processor, and upon the activation of the shuffle module, the first pair data from the first local tuple space into a global tuple space accessible by the first map module and the second map module, wherein the global tuple space implements associative memory model;
    inserting, by the processor, and upon the activation of the shuffle module, the second pair data from the second local tuple space into the global tuple space;
    identifying, by the shuffle module of the processor, pair data including the particular key in the global tuple space;
    fetching, by the shuffle module of the processor, the identified pair data from a memory; and
    executing, by the shuffle module of the processor, a shuffle operation on the fetched identified pair data to generate the dataset, wherein the dataset includes the particular key and one or more values associated with the particular key.

2. The method of claim 1, wherein prior to generating the first pair data and the second pair data, the method further comprising:
    partitioning, by the processor, the source data into at least a first partition and a second partition;
    assigning, by the processor, the first map module to generate the first pair data based on the first partition; and
    assigning, by the processor, the second map module to generate the second pair data based on the second partition.

3. The method of claim 1, wherein prior to fetching the identified pair data, the method further comprising:
storing, by the processor, the first pair data in the memory at a first set of memory addresses;
mapping, by the processor, the first set of memory addresses to the first local tuple space;
storing, by the processor, the second pair data in the memory at a second set of memory addresses; and
mapping, by the processor, the second set of memory addresses to the second local tuple space.

4. The method of claim 3, further comprising:
mapping, upon the activation of the shuffle module, by the processor, the first set of memory addresses to the global tuple space; and
mapping, upon the activation of the shuffle module, by the processor, the second set of memory addresses to the global tuple space.

5. The method of claim 4, wherein identifying the pair data includes identifying, by the shuffle module of the processor, memory addresses storing the pair data based on the mappings of the first set of memory addresses and the second set of memory addresses to the global tuple space.

6. The method of claim 1, wherein:
the shuffle module is a first shuffle module of the processor,
the particular key is a first particular key, and the method further comprising:
activating, by the processor, a second shuffle module of the processor to execute the shuffle operation on pair data that includes a second particular key;
identifying, by the second shuffle module of the processor, pair data including the second particular key in the global tuple space;
fetching, by the second shuffle module of the processor, the pair data including the second particular key from the memory; and
executing, by the second shuffle module processor, the shuffle operation on the fetched pair data that includes the second particular key to generate the dataset such that the dataset includes pair data that includes the first particular key and pair data that includes the second particular key.

7. The method of claim 1, wherein the first local tuple space is inaccessible by the second map module, and the second local tuple space is inaccessible by the first map module.

8. The method of claim 1, further comprising:
prior to inserting the first pair data into the global tuple space, appending, by the processor, metadata to each key among the first pair data to generate a first global key, wherein the first global key identifies the first map module, and wherein inserting the first pair data includes inserting the first pair data with the first global key; and
prior to inserting the second pair data into the global tuple space, appending, by the processor, metadata to each key among the second pair data to generate a second global key, wherein the second global key identifies the second map module, and wherein inserting the second pair data includes inserting the second pair data with the second global key.

9. The method of claim 1, further comprising, in response to generation of the dataset:
removing, by the processor, the first pair data from the first local tuple space;
removing, by the processor, the second pair data from the second local tuple space; and
removing, by the processor, the first pair data and the second pair data from the global tuple space.

10. A system effective to shuffle source data to generate a dataset, the system comprising:
a memory configured to store the source data;
a processor configured to be in communication with the memory;
at least a first map module and a second map module configured to be in communication with the memory and the processor;
at least one shuffle module configured to be in communication with the memory and the processor;
the first map module is configured to:
generate first pair data from the source data;
insert the first pair data into a first local tuple space accessible by the first map module, wherein the first local tuple space implements associative memory model;
the second map module is configured to:
generate second pair data from the source data;
insert the second pair data into a second local tuple space accessible by the second map module, wherein the second local tuple space implements associative memory model;
the processor is configured to:
activate the shuffle module to execute a shuffle operation on pair data that includes a particular key;
insert, upon the activation of the shuffle module, the first pair data from the first local tuple space into a global tuple space accessible by the first map module and the second map module, wherein the global tuple space implements associative memory model;
insert, upon the activation of the shuffle module, the second pair data from the second local tuple space into the global tuple space;
the shuffle module is further configured to:
identify the pair data that includes the particular key in the global tuple space;
fetch the identified pair data from the memory; and
execute the shuffle operation on the fetched identified pair data to generate the dataset, wherein the dataset includes the particular key and one or more values associated with the particular key.

11. The system of claim 10, wherein the processor is further configured to, prior to generating the first pair data and the second pair data:
partition the source data into at least a first partition and a second partition;
assign the first map module to generate the first pair data based on the first partition; and
assign the second map module to generate the second pair data based on the second partition.

12. The system of claim 10, wherein the processor is further configured to:
store the first pair data in the memory at a first set of memory addresses;
map the first set of memory addresses to the first local tuple space;
store the second pair data in the memory at a second set of memory addresses; and
map the second set of memory addresses to the second local tuple space.

13. The system of claim 12, wherein the processor is further configured to:
map, upon the activation of the shuffle module, the first set of memory addresses to the global tuple space; and map, upon the activation of the shuffle module, the second set of memory addresses to the global tuple space.

14. The system of claim 13, wherein the shuffle module is further configured to identify memory addresses storing the pair data that includes the particular key based on the mappings of the first set of memory addresses and the second set of memory addresses to the global tuple space.

15. The system of claim 10, wherein:
the shuffle module is a first shuffle module,
the particular key is a first particular key, and
the processor is further configured to activate a second shuffle module to execute the shuffle operation on pair data that includes a second particular key;
the second shuffle module is configured to:
fetch pair data that includes the second particular key from the memory; and
execute the shuffle operation on the fetched pair data that includes the second particular key to generate the dataset such that the dataset includes pair data including the first particular key and pair data including the second particular key.

16. The system of claim 10, wherein the first local tuple space is inaccessible by the second map module, and the second local tuple space is inaccessible by the first map module.

17. The system of claim 10, wherein the processor is further configured to:
remove the first pair data from the first local tuple space;
remove the second pair data from the second local tuple space; and
remove the first pair data and the second pair data from the global tuple space.

18. A computer program product for shuffling source data to generate a dataset, the computer program product comprising a computer readable storage medium having program instructions embodied therewith, the program instructions executable by a device to cause the device to:
generate first pair data from the source data;
generate second pair data from the source data, wherein each pair data among the first pair data and the second pair data includes a key and a value associated with the key;
insert the first pair data into a first local tuple space accessible by a first map module of the device, wherein the first local tuple space implements associative memory model;
insert the second pair data into a second local tuple space accessible by a second map module of the device, wherein the second local tuple space implements associative memory model;
activate a shuffle phase indicated by the program instructions to execute a shuffle operation on pair data that includes a particular key;
insert, upon the activation of the shuffle phase, the first pair data from the first local tuple space into a global tuple space accessible by the first map module and the second map module, wherein the global tuple space implements associative memory model;
insert, upon the activation of the shuffle phase, the second pair data from the second local tuple space into the global tuple space;
identify pair data including the particular key in the global tuple space;
fetch the identified pair data from a memory; and
execute the shuffle operation on the fetched identified pair data to generate the dataset, wherein the dataset includes the particular key and one or more values associated with the particular key.

19. The computer program product of claim 18, wherein the first local tuple space is inaccessible by the second map module, and the second local tuple space is inaccessible by the first map module.

20. The computer program product of claim 18, wherein the program instructions are further executable by the device to cause the device to:
partition the source data into at least a first partition and a second partition;
assign a first map module to generate the first pair data based on the first partition; and
assign a second map module to generate the second pair data based on the second partition.

* * * * *